US011595786B2

(12) United States Patent
Ahrens

(10) Patent No.: US 11,595,786 B2
(45) Date of Patent: Feb. 28, 2023

(54) EARLY ALERT AND LOCATION INTELLIGENCE GEOGRAPHIC INFORMATION SYSTEM

(71) Applicant: Armor at Hand, Hermosa Beach, CA (US)

(72) Inventor: Chad A Ahrens, Hermosa Beach, CA (US)

(73) Assignee: Armor at Hand, Hermosa Beach, CA (US)

( * ) Notice: Subject to any disclaimer, the term of this patent is extended or adjusted under 35 U.S.C. 154(b) by 148 days.

(21) Appl. No.: 17/206,825

(22) Filed: Mar. 19, 2021

(65) Prior Publication Data

US 2022/0303724 A1    Sep. 22, 2022

(51) Int. Cl.
| | |
|---|---|
| *H04W 4/029* | (2018.01) |
| *G08B 31/00* | (2006.01) |
| *G08B 25/00* | (2006.01) |
| *G08B 7/06* | (2006.01) |
| *H04M 1/72421* | (2021.01) |
| *H04W 4/90* | (2018.01) |
| *H04M 1/72457* | (2021.01) |
| *G16Y 20/10* | (2020.01) |
| *G06F 3/04847* | (2022.01) |
| *G06F 3/0482* | (2013.01) |
| *G16Y 10/60* | (2020.01) |

(52) U.S. Cl.
CPC ............ *H04W 4/029* (2018.02); *G08B 7/066* (2013.01); *G08B 25/006* (2013.01); *G08B 31/00* (2013.01); *H04M 1/72421* (2021.01); *H04M 1/72457* (2021.01); *H04W 4/90* (2018.02); *G06F 3/0482* (2013.01); *G06F 3/04847* (2013.01); *G16Y 10/60* (2020.01); *G16Y 20/10* (2020.01)

(58) Field of Classification Search
CPC ........ H04W 4/029; H04W 4/90; G08B 7/066; G08B 25/006; G08B 31/00; H04M 1/72421; H04M 1/72457; G06F 3/0482; G06F 3/04847; G16Y 10/60; G16Y 20/10
See application file for complete search history.

(56) References Cited

U.S. PATENT DOCUMENTS

2019/0182649 A1* 6/2019 Best .................... H04W 4/023
2021/0153001 A1* 5/2021 Eisner .................. H04W 4/90

* cited by examiner

Primary Examiner — Joshua L Schwartz
(74) Attorney, Agent, or Firm — Schmelzer IP

(57) ABSTRACT

An early alert and location intelligence geographic information system (GIS) includes a plurality of Internet of Thing (IoT) devices and a GIS system. The GIS system tracks locations and movements of the IoT devices and is activated when an IoT device signals detection of a threat or an urgent medical need. Based on locations and escalating state changes of the IoT devices, alerts are provided to the IoT devices, and the threat location, a danger zone and a buffer zone are calculated and displayed on a mobile software application. Based on device proximity to the threat location, the GIS system communicates escape directions and shelter guidance to the mobile software applications of those affected. Smart alert escalations are provided as needed to security, law enforcement and medical personnel.

19 Claims, 19 Drawing Sheets

Active Device List 322

| Device ID | Condition | Device Active | Device On-Time Max | In-Sight Press Time | On-Time Remaining Count | On-Time Remaining | Sort By Most Time Remaining | In Polygon? Yes/No |
|---|---|---|---|---|---|---|---|---|
| Device 3 | In-Sight Button Press | True | 10 | 1 | 9 | True | 1 | Y |
| Device 9 | In-Sight Button Press | True | 10 | 1 | 9 | True | 2 | Y |
| Device 5 | In-Sight Button Press | True | 10 | 2 | 8 | True | 3 | Y |
| Device 8 | In-Sight Button Press | True | 10 | 2 | 8 | True | 4 | Y |
| Device 7 | In-Sight Button Press | True | 10 | 3 | 7 | True | 5 | Y |
| Device 4 | In-Sight Button Press | True | 10 | 3 | 7 | True | 6 | Y |
| Device 6 | In-Sight Button Press | True | 10 | 3 | 7 | True | 7 | Y |
| Device 10 | In-Sight Button Press | True | 10 | 4 | 6 | True | 8 | Y |
| Device 11 | In-Sight Button Press | True | 10 | 5 | 5 | True | 9 | N |
| Device 3 | In-Sight Button Press | True | 10 | 6 | 4 | True | 10 | N |
| Device 2 | In-Sight Button Press | True | 10 | 12 | -2 | False | 11 | N |
| Device 1 | Movement | True | 10 | 14 | -4 | False | 12 | N |

If, "On-Time Remaining" True, event is available for polygon.

Maximum of top 8 with most time remaining are used for polygon.

If "Initial Shield" has In-Sight Press event then it is again added to the list with new start time.

Eligible for polygon but limited by 8 max.

FIG. 7

EARLY ALERT AND LOCATION INTELLIGENCE GEOGRAPHIC INFORMATION SYSTEM

BACKGROUND OF THE INVENTION

Violent acts and urgent medical needs are common within workplaces, schools, government buildings, hospitals, places of worship, in urban areas and in other public event spaces. A response time of two to five minutes to such events is typically the best that can be achieved. During those first two to five minutes, there is often a rapid and exponential escalation from threat to terrible harm.

An urgent medical need can arise in the office or in the classroom next door without anyone knowing, with precious time to save lives being lost. Other people nearby that could help are not alerted and once they are aware of the medical need the location is not easily shared.

A violent attack can be very dynamic, as the threat is often moving and affecting multiple people. More harm occurs because the location of the attacker is not known, and the incidents are terrifying for those affected. It is difficult for first responders to end the incident without knowing the location of the attacker. Worse yet, though immediate medical assistance is needed for incidents that occur as the attack progresses, medical responders are unable to provide that assistance since they do not know the incident locations.

Staff, students, congregations and others in public spaces are typically trained to exit a threat area as quickly as possible. However, a safe escape route may not be readily apparent. Moreover, pursuing an escape route could inadvertently put one within sight of the attacker. On the other hand, staying in place or hiding may trap people within an area and render them defenseless. With every movement of the attacker, the options for those affected change.

SUMMARY OF THE INVENTION

The present invention solves these problems by providing a system of dedicated Internet of Things (IoT) devices that geo-locate the incident, alert those nearby, and alert a succession of others up to first responders and 911. By providing geo-locations and smart alerts, immediate intervention and de-escalation before there is harm is possible. The invention also provides means for determining and sharing locations of the moving attacker, those initially affected, and those affected as the attack progresses. By locating the moving threat, those affected can be guiding to safety.

The present invention provides early alert and intervention for people confronted with violence or an urgent medical condition. Upon autonomous or manual activation of an Internet of Things (IoT) device (which may be wearable) during an incident, nearby IoT devices are alerted based on their proximity to the activated IoT device. The alert also escalates to others as needed such as security personnel, first responders and 911 personnel. The IoT device alert may include audio, visual and vibration alert components. Help is instantly summoned for those affected, and others are made aware that a violent or medical emergency situation exists. Alerts are made to appropriate user profiles based on the type of emergency, its severity, and the proximity of users to the incident. Early intervention provides an opportunity to deescalate a violent threat situation before there is harm, and to provide immediate care for medical emergencies.

The present invention provides a plurality of IoT devices whose movements are geo-located and tracked. An indicator for each IoT device, based on the state of the device, is shown on 2D or 3D geographic information system (GIS) site maps. When the state of a device changes, the corresponding indicator for the device changes and moves on the site map in real-time. If a device is "asleep", for example, its indicator may be green. If the device is awakened because of a violent threat, its indicator may be red. If urgent medical care is needed for the user of the device, its indicator may be blue. For violent threats, a threat location danger zone and a buffer area are also indicated on the site map. As the threat moves through the site map, "breadcrumb" indications follow its path and the states of the surrounding devices change as they enter and exit the threat buffer area. Based on the threat location, the indicators may change to a large green arrow, for example, pointing to a route away from the threat and guiding those affected to an escape path. Alternatively, the indicators may change to a large red X, for example, which is a suggestion to shelter-in-place.

Separate from the IoT device, a GIS mobile application is provided that displays IoT device indicators in real-time on a site map on a user mobile device, such as a phone, tablet, or in a computer browser. From the GIS mobile application, users can indicate the severity of the event, increase or decrease the buffer zone surrounding the threat area, join a security team call, place a 911 call to a local 911 center, and input an "all clear" indication, ending the incident. The GIS mobile application is used by those that are being protected and is also shared externally with first responders, enabling precise location of and response to the threat or medical need.

The present invention, including the IoT devices, the associated GIS system and the GIS mobile application, is suitable for urban areas, workplaces, schools, hospitals, places of worship and any other space where people gather. IoT devices may be deployed to staff, citizens, and first responders, including law enforcement, medical, and firefighting personnel. Deployments to various different groups in a given area creates a unified, area-wide, GIS driven response system of shared information.

One embodiment of the system "awakens" an IoT device in five different scenarios: 1) detection of motion over a pre-defined threshold for a pre-defined time; 2) detection of a g force over a pre-defined threshold; 3) detection of degrees of orientation over a predefined number of degrees; 4) on press of an "In-Sight" button; or 5) on slide of a "Med-Alert" switch. When the device awakens, an alert is immediately sent via wireless transmission by a processing module in the device to a central server. The central server, in turn, alerts other IoT and mobile devices based on their geo-location proximity to the incident, and based on their profile settings (such as first responders). Vibration, audio and visual alert capabilities are provided on the IoT devices.

The IoT devices perform edge processing and computation, and store data such as device and alert states as well as pre-recorded video, text and audio. A mobile software application is provided on a user-connected computer or mobile device in communication with a central server, which includes an online GIS site map showing device indicators, locations and movements. Each device is depicted as an icon on the online map, with its color and appearance indicating the state of the device, whether the device is moving, the rate of motion of the device and whether the user has pressed a button indicating that an attacker is "In-Sight" or has turned on the "Med-Alert" switch indicating that medical assistance is needed.

Location data gathered by the IoT device and sent to the server is used to generate and overlay on the map the attacker location, a danger zone and buffer area surrounding the attacker location, and the attacker's path of movement. Location data, such as which IoT devices are moving, the locations and rates of movement of the moving devices, order of movement of the devices, and which devices are signaling an attacker-in-sight or need for medical assistance, can be used to predict future movement of the attacker. An "instant on" audio listen and record option and speaker enabling voice communication from first responders to those affected may also be provided.

BRIEF DESCRIPTION OF THE DRAWINGS

FIG. 7 is a table setting forth an exemplary active device list according to the present invention.

DETAILED DESCRIPTION OF THE INVENTION

The present invention is directed to an early alert and location intelligence geographic information system (GIS). The system is comprised of a plurality of Internet of Thing (IoT) devices whose movements are geo-located and tracked, a GIS system of central computer servers, and a mobile application. The IoT devices are deployed to and worn by users, citizens, staff, and first responders including law enforcement, medical, and firefighting personnel in a workplace, school, place of worship, or any other public space. The IoT devices communicate with and send alerts to nearby IoT devices, and also communicate with the GIS system, which produces outputs back to the IoT devices, to the mobile application and to other third-party systems. Separate from the IoT device, the mobile application displays the site map with indicators in real-time on a user mobile device, such as on a phone or tablet, or on a computer browser.

Figure 1:
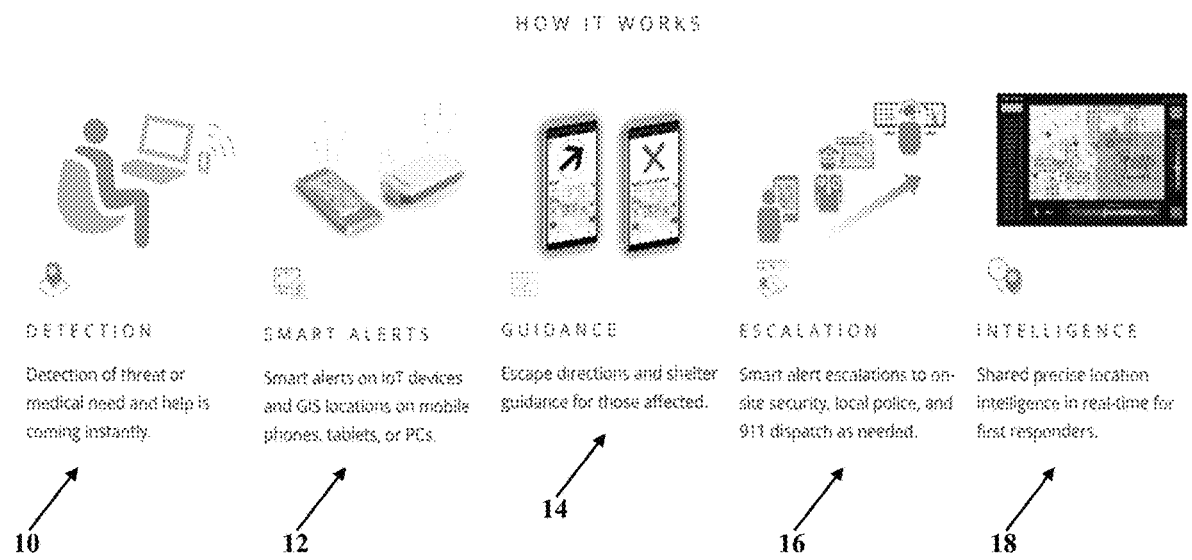
FIG. 1 is an overview diagram of the present invention.

An overview of the present invention is shown in FIG. 1. The system is initiated when an IoT device signals detection of a threat or urgent medical need. Help, if needed is dispatched immediately based on the location of the device and the threat or need (10). Based on processing by a GIS system, smart alerts are provided on user IoT devices, and GIS locations are indicated on a mobile software application on user phones, tablets and/or PCs (12). The GIS system communicates escape directions and shelter guidance to the mobile applications of those affected (14). Smart alert escalations to personnel such as on-site security, law enforcement, first responders and 911 dispatchers are provided as needed (16). Precise location intelligence is shared in real-time with personnel such as on-site security, law enforcement, first responders and 911 dispatchers (18).

Figure 2:
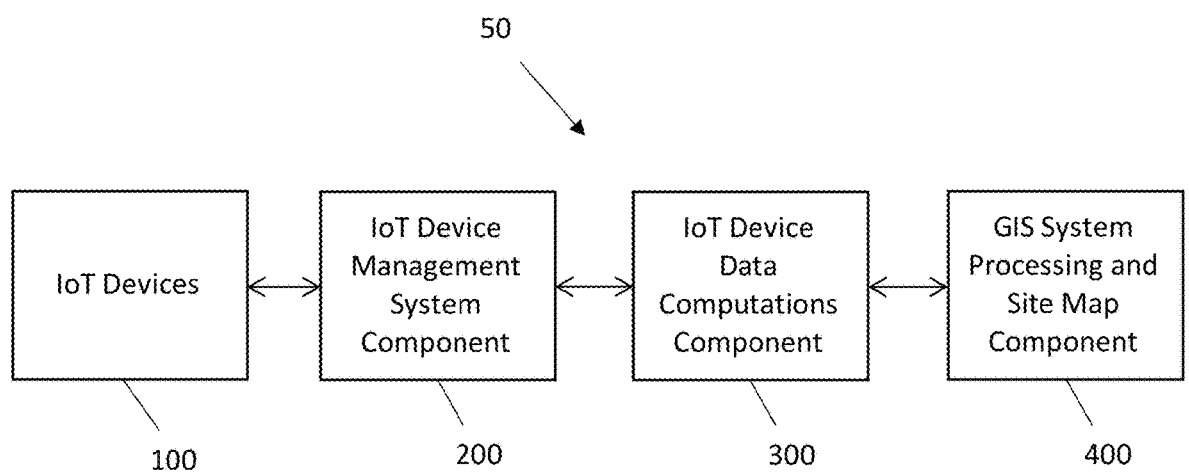
FIG. 2 is a block diagram of a GIS system according to the present invention.

FIG. 2 is a block diagram of a GIS system 50 according to the present invention. GIS system 50 includes IoT devices 100, device management component 200, data computation component 300 and GIS site map component 400. As shown in FIG. 2, there is two-way communication between all components of GIS system 50.

System 50 comprises a plurality of IoT devices 100. An exemplary IoT device 100 is illustrated in more detail FIGS. 3 and 4. IoT device 100 includes processor 102, memory 104 power source 106, movement/acceleration/orientation sensor 110, input devices 120, output devices 130, wireless connectivity components 140, and wired connectivity components 150.

Figure 4:
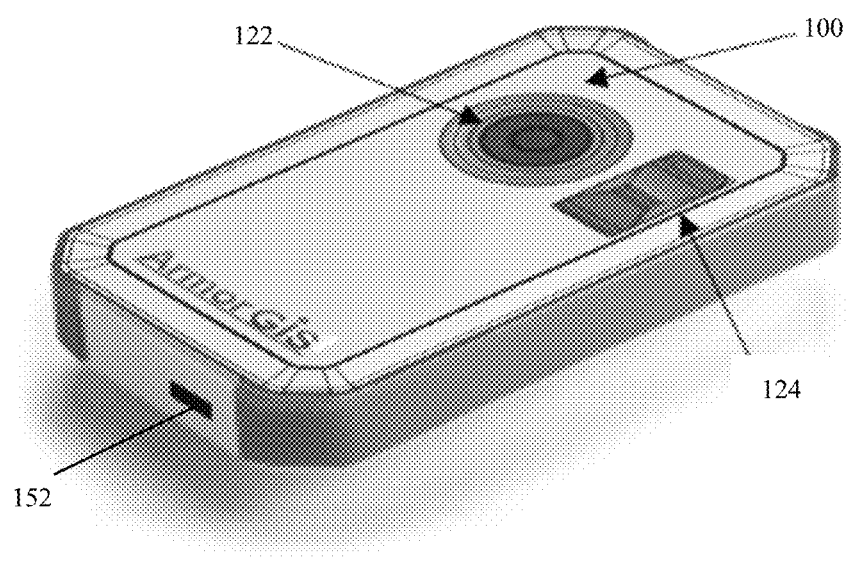
FIG. 4 is a perspective view of an IoT device according to the present invention.

In one embodiment, IoT device 100 is embodied in a compact, hand-held unit, such as that shown in the perspective view of FIG. 4. However, IoT device 100 may be implemented in other ways. For example, IoT device 100 may be incorporated into a hand-held shield, such as that described in applicant's co-pending U.S. application Ser. No. 16/284,338, which is incorporated herein by reference. Alternatively, IoT device may be incorporated into a wearable device such as a watch.

Processor 102 includes firmware for performing edge processing on data captured by IoT device 100. Memory 104 stores data collected by movement/acceleration/orientation sensor 110 as well as user and configuration data for device 100. Power source 106 provides power to the components of device 100.

Movement/acceleration/orientation sensor 110 captures data indicative of movement, acceleration and orientation of IoT device 100. In one implementation, orientation sensor 110 is a 9-axis sensor that includes an accelerometer, magnetometer and gyroscope that can detect motion, acceleration, orientation and whether movement is walk, run or stairs movement. Sensor 110 may be, for example, the BN0080/BN0085 from CEVA Technologies, Inc. Additional sensors 110 may optionally be provided such as, for example, environmental sensors to sense variables such as temperature.

Input devices 120 include "in-sight" button 122 allowing a user to signal that an attacker is in sight, "med-alert" slide switch 124 allowing a user to signal an urgent medical emergency, and microphone 126. The perspective view of FIG. 4 illustrates in-sight button 122 and med-alert slide switch 124 in greater detail. Additional input devices 120 may also be provided such as, for example, a reset button, a mode selection button, programmable buttons and/or a touch screen. Output devices 130 include speaker 132, vibration generator 134 and visual display 136. Visual display 136 may include, for example, LED lights and/or a display screen. Additional output devices 130 may be provided as needed.

Wireless connectivity components 140 provide for two-way wireless communication with other IoT devices 100, the other components of system 50, and third-party devices. Wireless connectivity components include WIFI module 142, Bluetooth module 144, cellular module 146, GNSS (global navigation satellite system) module 148, NFC (near field communications) module 149 and their associated antennae. Wired connectivity components 150 may include, for example, USB or USB-C port 152 (FIG. 4). Additional wired connectivity components such as a power input to charge power source 106 may be provided as needed.

Figure 3:
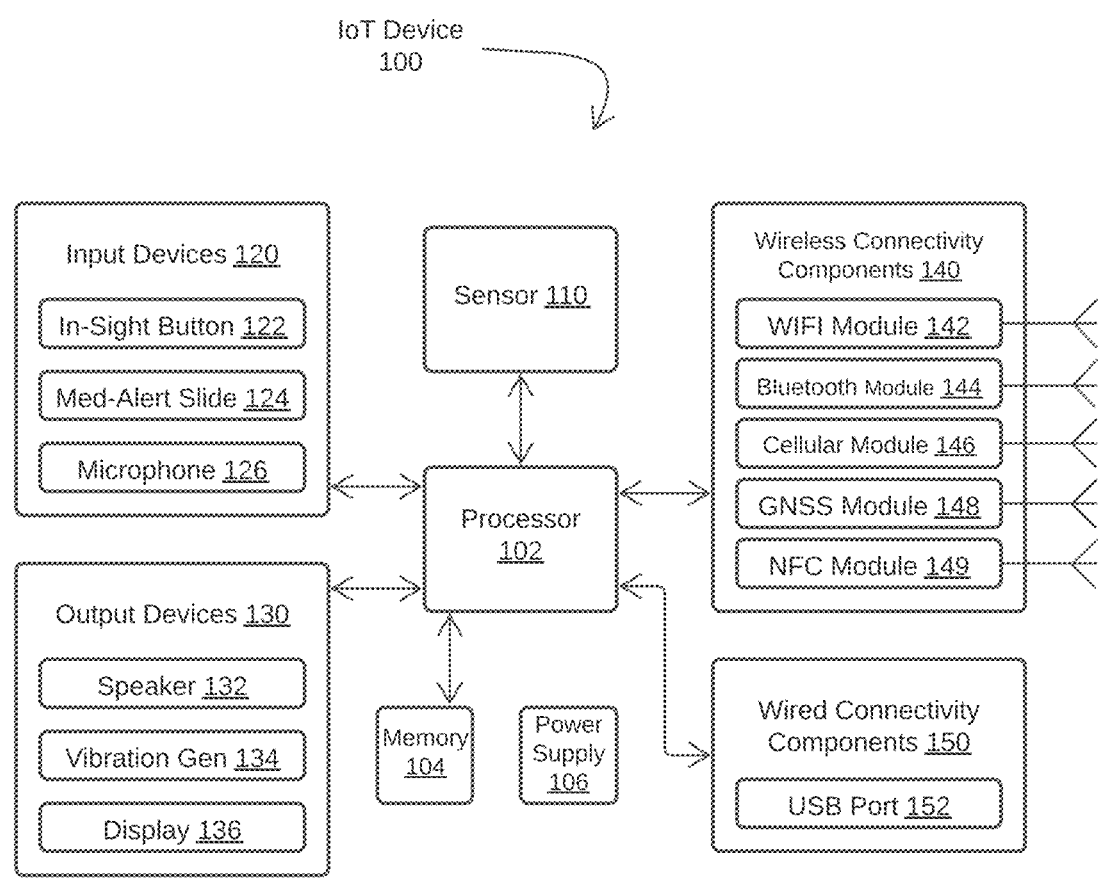
FIG. 3 is a block diagram of an IoT device according to the present invention.

The block diagram set forth in FIG. 3 is but one possible implementation of an IoT device 100 that may employ or be configured with aspects of the present invention.

Figure 5:
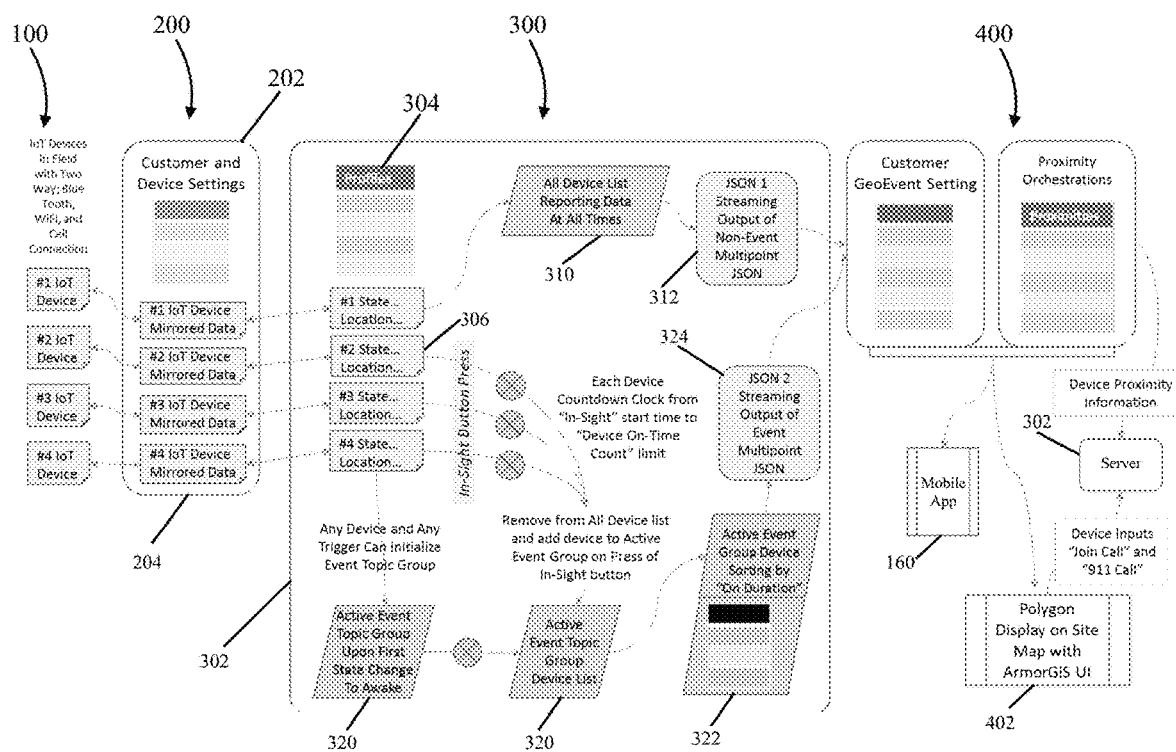
FIG. 5 is a more detailed block diagram and dataflow of the system of the present invention.
Figure 6:
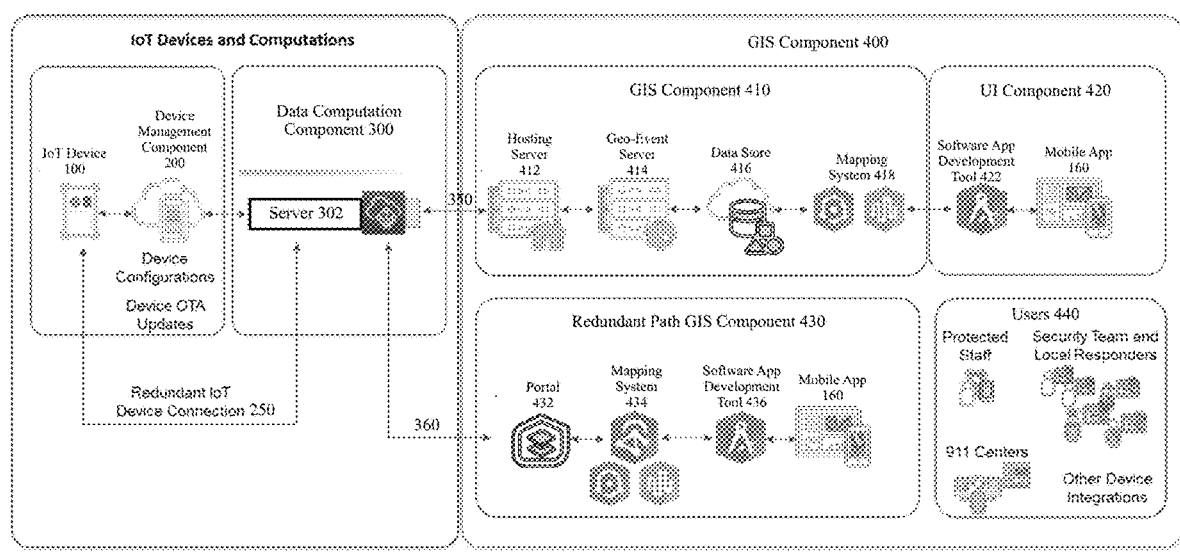
FIG. 6 is a block diagram showing components of FIG. 2 in greater detail.

Components 200, 300 and 400 of system 50 are shown in more detail in FIGS. 5-6. Two-way communication occurs between IoT devices 100 and components 200, 300 and 400, which produce outputs to the software application on user mobile devices, and to other third-party systems. Two-way communication occurs amongst IoT devices 100 themselves as well with third-party devices having WIFI, Bluetooth and/or cellular communication capability. Components 200, 300 and 400 include servers that compute and store data, site maps, customer settings, user profiles, device settings and sensor threshold limits.

Device management component 200 stores the settings and configurations for each user and for each device in central server 202 (IoT device mirrored data 204) and in memory 104 of each IoT device 100. Component 200 may also provide over the air (OTA) updates to IoT devices 100. In one implementation, component 200 is wholly or partially implemented in an edge-to-cloud IoT platform such as that provided by Particle Industries, Inc.

Device management component 200 communicates via the Internet cloud with data computation component 300. To ensure robustness, as shown in FIG. 6, redundant IoT device connection 250 is also provided between IoT devices 100 and data computation component 300. Data computation component 300 includes a central server 302 that, as explained in more detail below, performs computations based on device locations, times, state and other values and variables. In one implementation, server 302 of data computation component 300 is wholly or partially implemented in a cloud computing platform, such as the Amazon Web Services (AWS) IoT core.

Server 302 stores profiles 304 (settings and configurations) for each user and device, and location and state data 306 for each device. Server 302 also maintains an "all device" list 310 of all IoT devices 100 in system 50, including the user profile and location, sensor and state data associated with each device. When an IoT device becomes active, server 302 also creates and maintains an active device group 320. As will be described in more detail herein, devices 100 are added to active device group 320 by triggering events such as changes in movement, acceleration or orientation, or actuation of in-sight button 122 or med-alert slide switch 124. IoT devices 100 in active device group 320 are sorted and prioritized based on variables, such as passage of time and the number of devices in group 320, into an active device list 322.

The data included in all device list 310 and in active device list 322, such as the states, locations, sensor data and profiles for each device, is streamed at 312 and 324 to GIS component 400. In one implementation, this information is streamed from component 300 to component 400 in JSON (JavaScript Object Notation). GIS site map component 400 performs computation including geo-filtering, geo-processing and geo-proximity analysis based on this information. In particular, the geo-locations of the devices in active device list 322 are used to calculate a threat location, and are used as polygon points to define a danger zone around the threat location. Device locations relative to the threat location and danger zone, as well as possible escape routes and shelter instructions, or suggestions to shelter in place, are provided by GIS component 400 to mobile applications 160 and to display 402.

In one implementation, GIS site map component 400 is wholly or partially implemented in a cloud-based software-as-a-service (SaaS) platform such as the ArcGIS location intelligence platform provided by Esri (Environmental Systems Research Institute). As shown in FIG. 6, component 400 may be implemented via two redundant GIS paths 350 and 360.

In FIG. 6, the first GIS path 350 comprises a cloud-based GIS component 410 and a separate user interface component 420. GIS component 410 may be hosted, for example, on the Amazon Web Services (AWS) elastic compute cloud (EC2) virtual server using the Ubuntu Linux operating system, and may comprise hosting server 412, geo-event server 414, data store 416 and mapping system 418. Hosting server 412 supplies mapping and GIS capabilities. Geo-event server 414 tracks the changing locations and states of IoT devices 100, performs analytics on this location and state data, and provides real-time situational awareness. Data store 416 stores the real-time location and state data streamed from geo-event server 414. Mapping system 418 provides 2D and 3D indoor and outdoor (urban) maps into which the location and state data of devices 100 may be incorporated. In the embodiment of FIG. 6, hosting server 412, geo-event server 414, data store 416 and mapping system 418 are implemented as ArcGIS SaaS platforms hosted on the AWC EC2 cloud computing platform. Alternatively, or in addition, the information from component 300 may be communicated to an alternative GIS system.

First GIS path 350 further comprises user interface component 420. User interface component 420 includes software application development tool 422 which, using the data streamed from GIS component 410, creates mobile application 160 that is deployed on mobile devices of the IoT device users. In the embodiment of FIG. 6, mobile application development tool 422 is implemented as the ArcGIS AppStudio platform hosted on Esri cloud-based servers.

In the second (redundant) GIS path 360, the GIS and user interface components are combined and hosted on a single component 430. Component 430 comprises portal 432, mapping system 434, mobile application development tool 436 and mobile application 160. Portal 432 supplies mapping and GIS capabilities, tracks the changing locations and states of IoT devices 100, and stores and performs analytics on this location and state data. Mapping system 434 provides indoor and outdoor (urban) maps into which the location and state data of devices 100 may be incorporated. Mobile application development tool 436, using the data streamed from portal 432 and mapping system 434, creates software application 160 that is deployed on user mobile devices. In the embodiment of FIG. 6, portal 432, mapping system 434 and tool 436 are implemented as ArcGIS SaaS platforms hosted on Esri cloud-based servers.

Users 440 including protected persons/staff, security teams and local responders, 911 centers and other device integrations may have access, which may vary based on their user profile and permissions, to mobile application 160 generated by GIS site map component 400.

Activation and operation of the components of system 50 is premised on escalating changes of the state of IoT devices 100. In sum, based on data received from IoT devices 100, device management component 200 changes the states of IoT devices 100 in escalating stages from "asleep", to "awake", to "alert" to "alarm". Device management component 200 reports these state changes to data computation component 300, which creates active device list 322 of all active devices involved in the incident, based on their reporting state. GIS site map component 400 uses the geo-locations of active devices as polygon points to calculate a threat location and to define a danger zone around the threat location, and a buffer area around the danger zone. The danger zone and buffer area are incorporated into a site map that shows the locations of all devices relative to the threat location, danger zone and buffer area, as well as directions to an escape path or instructions to shelter in place. This site map is communicated to software application 160 on the mobile devices of protected users, first responders, security personnel, site staff, etc.

State Escalation—Device Management Component 200

Activation of IoT devices 100 and movement to an "awake" state and further escalating states occurs in multiple ways: (1) when device movement sensed by sensor 110 exceeds a pre-defined movement threshold for a pre-defined period of time; (2) when acceleration (gravitational acceleration or "g") sensed by sensor 110 exceeds a pre-defined "high g" parameter; (3) when the degrees of orientation sensed by sensor 110 exceeds a pre-defined orientation parameter for a pre-defined period of time; (4) when in-sight button 122 is pressed; and (5) when med-alert button or slide 124 is actuated. These "orchestrations" from an asleep state to an awake state are performed by device management component 200, as explained in more detail below.

Activation by Movement

A first method by which IoT devices 100 may move from an asleep state to an awake state and further escalating states is detection by sensor 110 of movement exceeding a pre-defined threshold of movement for a pre-determined period of time. The threshold of movement required to trigger detection of movement may be set by adjusting the sensitivity of the accelerometer of sensor 110, typically to a low, medium or high setting, and is stored in component 200. In the description below, "detection of movement" means that movement sensed by sensor 110 exceeds the pre-defined threshold of movement stored in component 200.

Sensors 110 of IoT devices 100 continuously output sensed movement of IoT devices 100 to component 200. When detection of movement of a particular IoT device 100 occurs, and continues for a time period exceeding a pre-defined awake time, the state of the IoT device is changed to "awake" by component 200. When detection of movement of the IoT device continues for a time period exceeding a pre-defined alert time, the state of the IoT device is escalated to "alert" by component 200. When detection of movement of the IoT device continues for a time period exceeding a pre-defined alarm time, the state of the IoT device is escalated to "alarm" by component 200. In one implementation, the awake time is pre-defined as two seconds, the alert time is pre-defined as three seconds, and the alarm time is pre-defined as five seconds.

(2) Activation by High G

A second method by which IoT devices 100 may move from an asleep state to an awake state and further escalating states is detection by sensor 110 of acceleration exceeding a pre-defined gravitational force "high g" acceleration that is stored in component 200. In one implementation, the "high g" acceleration is 0.5 g. In the description below, "detection of high g" means that acceleration sensed by sensor 110 exceeds the pre-defined high g.

Sensors 110 continuously output the sensed acceleration of IoT devices 100 to component 200. When detection of high g of a particular IoT device 100 occurs exceeding a high g awake trigger, the state of the IoT device is changed to "awake" by component 200. When detection of high g of the IoT device continues for a time period exceeding a pre-defined alert time, the state of the IoT device is escalated to "alert" by component 200. When detection of high g of the IoT device continues for a time period exceeding a pre-defined alarm time, the state of the IoT device is escalated to "alarm" by component 200. In one implementation, the awake time is pre-defined as two seconds, the alert time is pre-defined as three seconds, and the alarm time is pre-defined as five seconds.

(3) Activation by Change in Orientation

A third method by which IoT devices 100 may move from an asleep state to an awake state and further escalating states is detection by sensor 110 of an orientation exceeding a pre-defined degree of orientation that continues for a pre-determined period of time. The pre-defined degree of orientation is stored in component 200 and, in one implementation, is 45 degrees. In the description below, "detection of orientation movement" means that sensor 110 senses an orientation movement that exceeds the pre-defined degree of orientation stored in component 200.

Sensors 110 of IoT devices 100 continuously output the sensed orientation of IoT devices 100 to component 200. When detection of orientation movement of a particular IoT device 100 occurs and continues for a duration exceeding a pre-defined awake time, the state of the IoT device is changed to "awake" by component 200. When detection of orientation movement of the IoT device continues for a duration exceeding a pre-defined alert time, the state of the IoT device is escalated to "alert" by component 200. When detection of orientation movement of the IoT device continues for a duration exceeding a pre-defined alarm time, the state of the IoT device is escalated to "alarm" by component 200. In one implementation, the awake time is pre-defined as one second, the alert time is pre-defined as 1.5 seconds, and the alarm time is pre-defined as two seconds.

(4) Activation by In-Sight Button

A fourth method by which IoT devices 100 may move from an asleep state to an awake and escalated state is by pressing in-sight button 122. When in-sight button 122 is pressed, the state of the IoT device is escalated directly from "asleep" to "alarm".

(5) Activation by Med-Alert Slide Switch

A fifth method by which IoT devices 100 may move from an asleep slate to an awake state and further escalating states is by operation of med-alert slide switch 124. In one implementation, upon any actuation of med-alert slide switch 124, the state of the IoT device is escalated directly from "asleep" to "alarm". Alternatively, there may be a gradual escalation of the state of the IoT device based on the duration of actuation of med-alert slide switch 124. For example, the state of the IoT device may be changed to: "awake" when med-alert slide switch 124 is actuated for a pre-defined awake time (one second, for example); to "alert" when med-alert slide switch 124 is actuated for a pre-defined alert time (1.5 seconds, for example); and to "alarm" when med-alert slide switch is actuated for a pre-defined alarm time (two seconds, for example).

The above-described methods by which the states of the IoT devices are gradually or abruptly escalated in seriousness are merely illustrative, and are not limiting. Alternative methods of state escalation, as well as different and/or additional states of escalation, are envisioned and are within the scope of this invention.

Data Computation Component 300—Active Device Group and Sorting

Once device management component 200 has changed the state of any IoT device 100 from "asleep" to "awake" or higher, system 50 is activated. The change in state is communicated from component 200 to data computation component 300, and triggers component 300 to create active device group 320 which includes the IoT device 100 that triggered the event. The location of the initial device added to active device group 320 is used to calculate the threat location. After active device group 320 is triggered by an activated device, in one embodiment, subsequent devices are added to group 320 only by pressing in-sight button 122. In another embodiment, subsequent devices may be added to group 320 by escalation to a pre-defined state (i.e. "awake", "alert" or "alarm"). As will be described in detail below, GIS system 400 uses the geo-locations of the devices in active device group 320 as polygon points to calculate a threat center location, to define a danger zone around the threat location, and to define a buffer area around the danger zone.

A device that has been added to active device group 320 is referred to herein as an "active" or "activated" device. When a device is activated, data computation component 300 starts an "awake clock" for that device. The elapsed time that each device has been active is tracked and is referred to as its "on time count". The awake clock and "on time count" for a device restarts on each repeated press of the in-sight button. The devices in group 320 are sorted and prioritized by their "on time count", from shortest to longest, into an active device list 322.

A maximum number of devices on active device list 322 that can be used as polygon points to define the danger zone is pre-defined and stored in component 300. In one implementation, the maximum number of devices that are used as polygon points is eight. When more than the maximum number of devices are active, devices with the longest "on time counts" are dropped from use as polygon points that define the danger zone.

Devices are also dropped from use as polygon points when their "on time count" exceeds a "maximum on time count". In one implementation, the "maximum on time count" is ten seconds. Thus, devices that have been active for longer than the "maximum on time count" are no longer used as polygon points to define the danger zone. A minimum number below at or below which devices are not dropped from use as polygon points is pre-defined and stored in component 300. In one implementation, this minimum number is three. Thus, when only three devices on list 322 remain available for use as polygon points due to the "on time count" of the other active devices on list 322 exceeding the maximum "on time count", those three devices remain available for use as polygon points regardless of the duration of their "on time count" (that is, until more devices are added to active device group 320, or until an "all clear" is given).

FIG. 7 is a table setting forth an exemplary active device list 322. There are twelve active devices in list 322 (column 3), with all but device 1 at the bottom of the list having been activated by an in-sight button press (column 2). As can be seen in column 4, the maximum "on time count" has been set to ten seconds. Column 5 sets forth the current "on time count" for each device, column 6 sets forth the "on time count" remaining for each device, and column 7 indicates whether there is any "on time" remaining. Devices 1 and 2 have an "on time" in excess of the maximum "on time", and thus are no longer used in polygon formation (see column 9—"In Polygon? Yes/No"). Moreover, as the maximum number of devices to be included in polygon formation is eight, the devices with the longest remaining on times—devices 3 and 11—have also been dropped from use in polygon formation. Thus, although there are twelve active devices, only the top eight devices with the most "on time" remaining are used in polygon formation.

GIS Site Map Component 400—Site Map Formation

The information from active device list 322 is streamed (see 324 of FIG. 5) to GIS site map component 400. In addition, the information from all device list 310 is streamed (see 312 of FIG. 5) to GIS site map component 400. All device list 310 includes all data associated with each IoT device 100 in system 50. Data concerning the location of IoT devices 100 is included on all device list 310. This location data is generated by, for example, WIFI module 142, Bluetooth module 144, cellular module 146, GNSS module 148 and NFC module 149, and includes GPS latitude/longitude and altitude; WIFI latitude/longitude and altitude; and Bluetooth latitude/longitude and altitude. Sensor data from sensor 110, including movement, acceleration and orientation data, is also included on all device list 310. State data for each device is also included in list 310, such as whether the device is active, and whether its in-sight button and/or med-alert slide have been actuated.

A user profile is also included in the data for each IoT device, which impacts the mobile application and user interface that is provided to that user. If the geographic area served by system 50 is a school campus, for instance, the data and user interface transmitted to the mobile application of a staff member will be different from the data and user interface transmitted to the mobile application of security personnel.

User profiles may additionally be used for guest mobile applications for users not associated with an IoT Device. For example, a visitor to a campus or a student using a guest user profile can access basic alert notifications, arrow, and x guidance features. This may be enabled by a user with a simple campus selection or automatic campus detection based on a geo-fence.

Figure 8A:
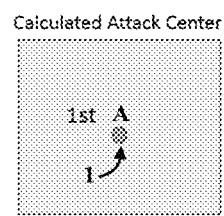
FIG. 8A is a diagram showing a threat location based on one active device.
Figure 8B:
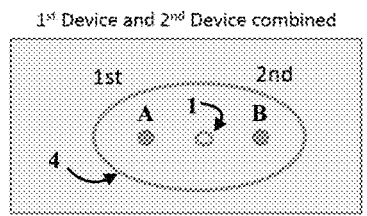
FIG. 8B is a diagram showing a threat location and danger zone based on two active devices.
Figure 8C:
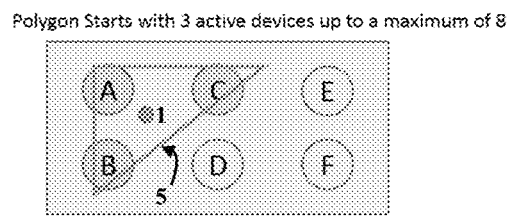
FIG. 8C is a diagram showing a threat location and danger zone based on three active devices.

FIGS. 8A, 8B and 8C illustrate how GIS site map component 400 calculates and displays a threat location 1 based on data received from active IoT devices 100. When an initial device A becomes active, as shown in FIG. 8A, threat location 1 coincides with the location of device A. When a second device B becomes active by press of its in-sight button, as shown in FIG. 8B, a polyline 4 is formed around active devices A and B, and threat location 1 is calculated as the center of polyline 4. When a third device C becomes active, as shown in FIG. 8C, a polygon 5 is formed to encompass active devices A, B and C, and threat location 1 is calculated as the center of polygon 5. As additional devices become active, a polygon is formed to encompass all active devices, up to a maximum of eight devices.

Figure 9A:
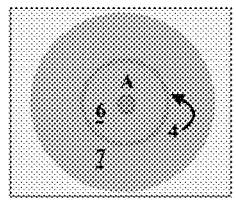
FIG. 9A is a diagram showing a threat location, danger zone and buffer area based on one active device.
Figure 9B:
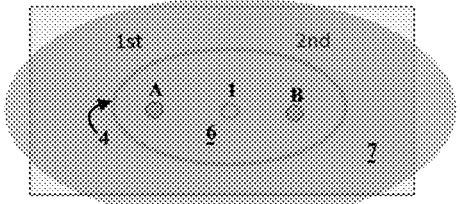
FIG. 9B is a diagram showing a threat location, danger zone and buffer area based on two active devices.
Figure 9C:
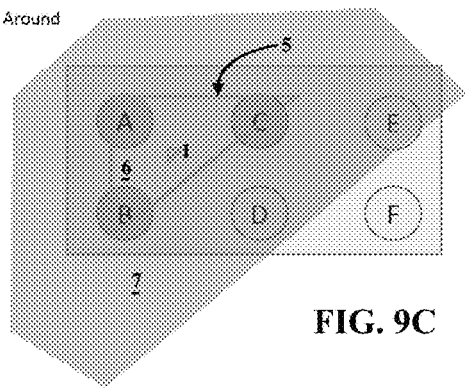
FIG. 9C is a diagram showing a threat location, danger zone and buffer area based on three active devices.

As shown in FIGS. 9A-9C, the area encompassed by polyline 4 or polygon 5 and having threat location 1 as its center is designated as danger zone 6. When there is only one active device, a polyline 4 may encircle that device to define danger zone 6 (FIG. 9A). The area of danger zone 6 may be adjusted (made larger or smaller) by changing a pre-defined "radius of attack" setting. A buffer area 7 is defined around danger zone 6, with a size that may be made larger or smaller by changing a pre-defined "radius of attack buffer" setting.

The shapes and locations of danger zone 6 and buffer area 7 are dynamic and change in real time based on the number of active IoT devices and their locations. FIG. 9B shows two active devices A and B encircled by polyline 4 to define danger zone 6 and buffer area 7. FIG. 9C shows three active devices A, B and C used as polygon points to define danger zone 6 and buffer area 7. In FIG. 9C, two additional devices D and E are present in buffer area 7, and will have their alert states escalated based on their proximity to the threat location.

GIS site map component 400 changes the states of IoT devices 100 based on their proximity to the calculated threat location. For example, devices within the buffer area (within alarm proximity) have their alarm state enabled; devices within an alert proximity of the threat location have their alert state enabled; and devices within an awake proximity of the threat location have their awake state enabled. In one implementation, alarm proximity is 50 feet, alert proximity is 150 feet, and awake proximity is 200 feet. Appropriate audio, visual and vibration effects are generated by output device 130 based on the alarm, alert or awake state of device 100.

Figure 10:
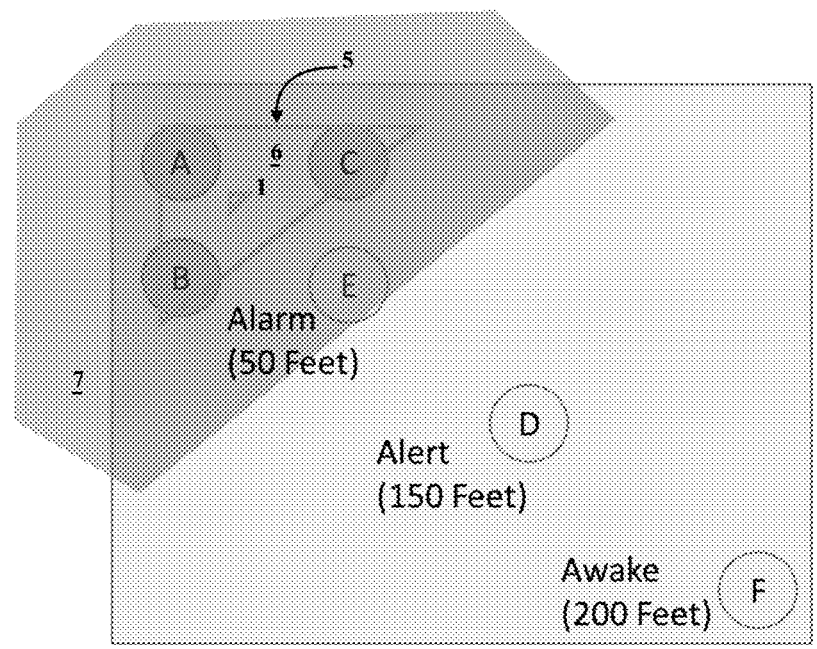
FIG. 10 is a diagram showing alarm, alert and awake IoT device states based on proximity to a calculated threat location.

As shown in FIG. 10, for example, threat location 1, polygon 5, danger zone 6 and buffer area 7 are generated by component 400 based on the geo-locations of three active devices A, B and C. Three other devices D, E and F are near the incident, but are not yet in the active device group because their users have not pressed their in-sight buttons. Device E is within alarm proximity (50 feet) of the threat location; device D is within alert proximity (150 feet) of the threat location; and device F is within awake proximity (200 feet) of the threat location. Based on these proximities, component 400 enables the alarm state in device E, the alert state in device D, and the awake state in device F.

Figure 11:
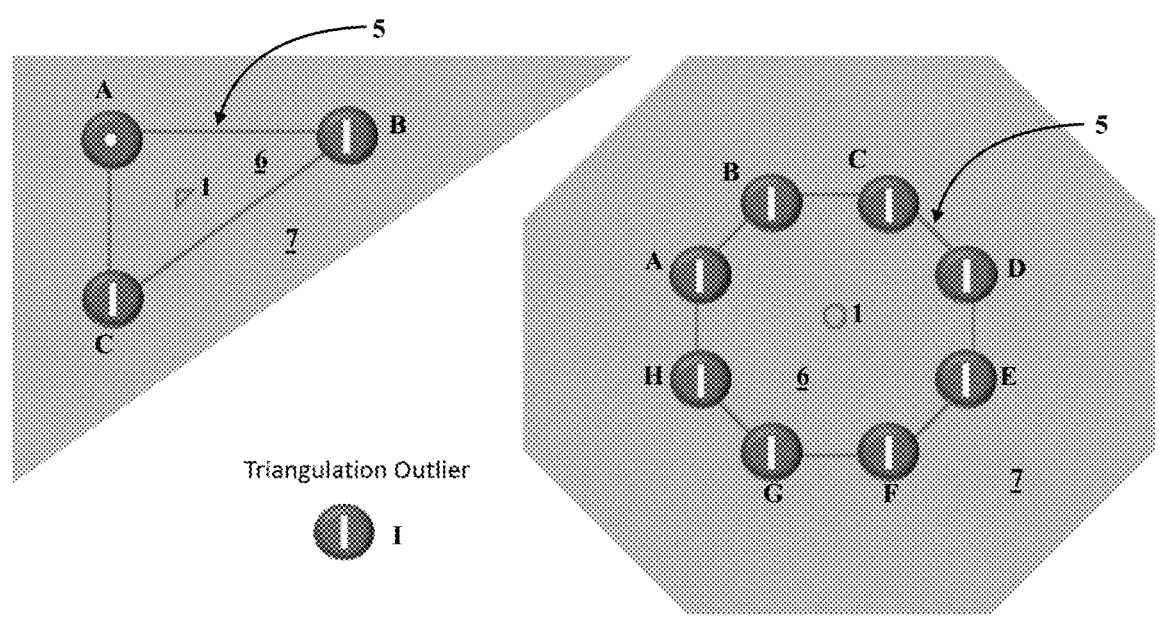
FIG. 11 illustrates danger zones and buffer areas defined by a lower polygon point count and by a higher polygon point count.

FIG. 11 illustrates that the polygon point count (number of devices included in the polygon formation), and associated danger zone 6 and buffer area 7, grow larger based on in-sight button presses from additional devices (up to eight devices A-H), and grow smaller as device "on time counts" exceed the maximum "on time" count (down to three devices A-C). The polygon shape 5 varies based on the locations and numbers of active IoT devices (the points of the polygon). If the distance of an IoT device from the threat location exceeds a pre-set outlier distance (see device I in FIG. 11), that device I is dropped from use as a polygon point even if time remains in its "on time count".

Figure 12:
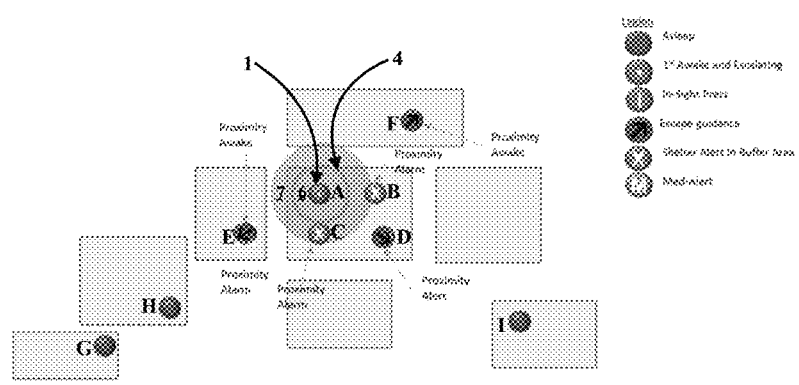
FIG. 12 is an example site map showing a plurality of IoT devices, with one device activated.

FIG. 12 is an example site map showing a plurality of IoT devices. In FIG. 12, one device A has been awakened based by one of the methods described above, i.e., by movement, high g, orientation change, or pressing the in-sight button. The location of device A is established as threat location 1, and polyline 4 is formed around device A to define danger zone 6. As discussed above, the area of danger zone 6 is set by a pre-defined "radius of attack" setting. Buffer area 7 is defined around danger zone 6, having a size set by the pre-defined "radius of attack buffer" setting.

Devices B and C are within buffer area 7, and thus within alarm proximity, and have their states changed to "alarm". Device D is outside of buffer area 7 but within alert proximity, and has its state changed to "alert". Devices E and F are outside of buffer area 7 but within awake proximity, and have their states changed to "awake". Devices G, H and I are outside of awake proximity from threat location 1 and remain in "asleep" state.

Figures 13A, 13B:
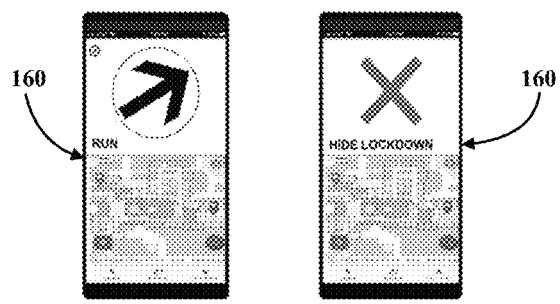
FIG. 13A depicts the mobile application as displayed on a phone, with a directional arrow pointing away from the threat location.
FIG. 13B depicts the mobile application as displayed on a phone, with an "X" to indicate instructions to shelter-in-place.

This information generated by GIS site map component 400 is displayed in real time in mobile applications 160 on user devices such as phones, tablets or computer browsers. FIGS. 13A and 13B depict mobile application 160 as displayed on a phone. The information displayed in mobile application 160 includes the device indicators, states and locations relative to the threat location, the danger zone and buffer area. For devices outside of the buffer area but within alert or awake proximity (devices D, E, F), instructions or directions to an escape path may be displayed on mobile application 160 (such as a large green directional arrow pointing away from the threat location as shown in FIG. 13A). For devices within alarm proximity (within the buffer area) (devices A, B, C), instructions to hide or shelter in place may be displayed on mobile application 160 (such as a large red "X" as shown in FIG. 13B).

In one implementation, in addition to the IoT device, the user's mobile device on which the mobile application is displayed is geolocated and tracked when the system is active. On activation of the system, for example, the user's mobile device may communicate location data of the mobile device to server 302. The location data from the IoT device and the user's mobile device can be combined into a single, more accurate location of the user. User profiles are used on the mobile application to enable the invention to function in the home system and as a guest mobile application within other system areas serviced by the invention, therefore enabling use at multiple system locations. User profiles also are used to enable multi-system uses for first responders.

Figure 14:
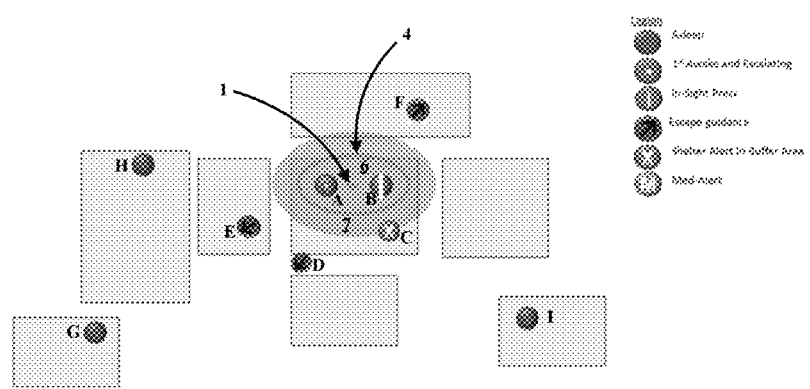
FIG. 14 is an example site map showing a plurality of IoT devices, with two devices activated.

FIG. 14 shows the site map of FIG. 12, updated after further device and threat location movement has occurred. Device B has pressed its in-sight button, and therefore is placed on the active device list along with device A and has its state changed to "alarm". The locations of devices A and B are used to calculate threat location 1 and to form polyline 4 around devices A and B, thereby defining danger zone 6 and buffer area 7. Device C remains within buffer area 7, and thus remains in an "alarm" state with instructions to hide or shelter in place ("X") displayed on the mobile application. Device D has moved outside of buffer area 7 but is within alert proximity, and thus has its state changed to "alert". Devices E and F remain outside of buffer area 7 but within awake proximity, and their states remain as "awake". Appropriate directional guidance (i.e. a directional arrow pointing away from the threat location) is displayed on the mobile application of devices D, E and F. Devices G, H and I are still outside of awake proximity from threat location 1, and remain in "asleep" state.

Figure 15:
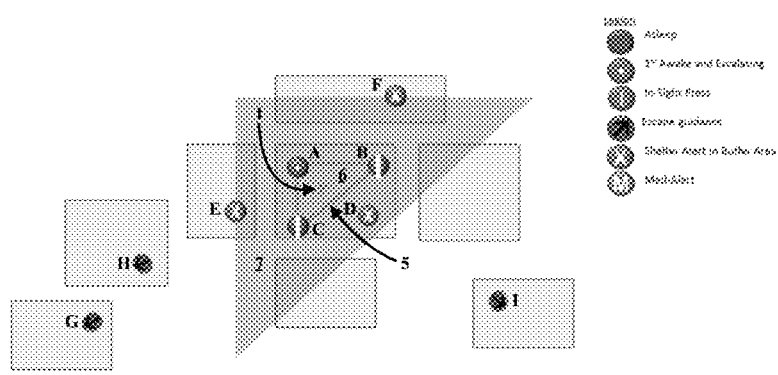
FIG. 15 is an example site map showing a plurality of IoT devices, with three devices activated.

FIG. 15 shows the site map after further device and threat location movement has occurred. Devices B and C have now pressed their in-sight buttons. Thus, devices A, B and C are now on the active device list and are used as points in polygon 5 to establish threat location 1 and to define an expanded danger zone 6 and buffer area 7. Devices D, E and F are now within buffer area 7, and thus are in an "alarm"

state with instructions to hide or shelter in place ("X") displayed on the mobile application. Devices G, H and I are now within awake proximity, and have their states changed to "awake" with appropriate directional guidance (i.e. a directional arrow pointing away from the threat location) displayed on the mobile application.

Figure 16:
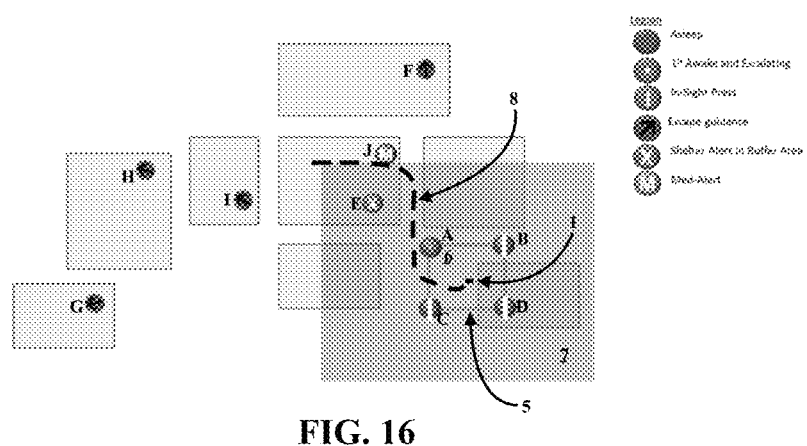
FIG. 16 is an example site map showing a plurality of IoT devices, with four devices activated.

FIG. 16 shows the site map after still further device and threat location movement. Devices B, C and D have now pressed their in-sight buttons. Thus, devices A, B, C and D are now on the active device list and are used as points in polygon 5 to establish threat location 1 and to define an expanded danger zone 6 and buffer area 7. Device E is within buffer area 7 and is placed in an "alarm" state with instructions to hide or shelter in place ("X") displayed on the mobile application. Devices F, G, H and I are now within awake proximity, and have their states changed to "awake" with appropriate directional guidance (i.e. a directional arrow pointing away from the threat location) displayed on the mobile application.

In FIG. 16, an additional device has been added to the points of polygon 5, and the locations of the active reporting devices have moved, causing a change in shape, size and location of danger zone 6 and buffer area 7. Threat location 1 is also changed, and a breadcrumb trail 8 is provided on the display to show movement from the previous threat location to the new threat location. Also in FIG. 16, an additional device J is present and has actuated its med-alert slide switch. This causes a notification to be transmitted to appropriate medical personnel for immediate medical response, as well as for device J to be placed in an alarm state.

Figure 17:
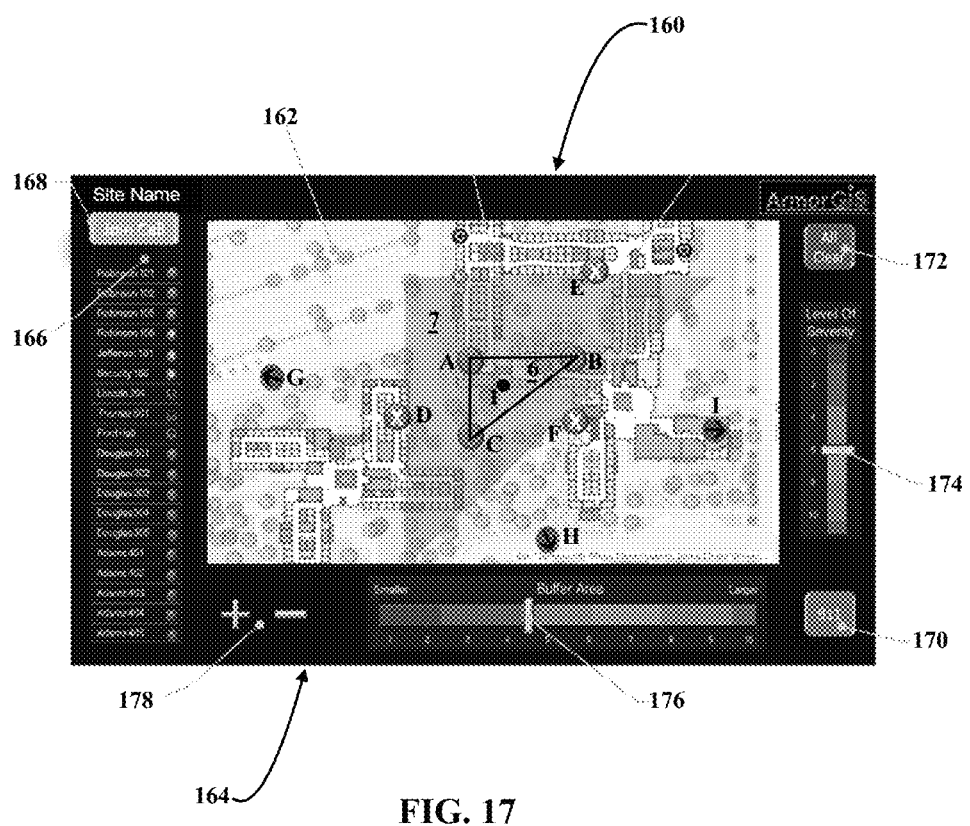
FIG. 17 is a screen shot of a mobile application according to the present invention.

FIG. 17 is a screen shot of mobile application 160, which may be displayed in a computer browser, or on a user device such as a phone or tablet. Mobile application 160 displays GIS information as described above and facilitates user interaction with the GIS system and with third-party systems such as 911. As can be seen in FIG. 17, mobile application 160 presents a site map 162, which may be 2D or 3D. As device states change, their corresponding indicators change and move on site map 162 in real-time. For example, if the device is "asleep" the indicator for a device may be green, if the system is "awakened" due to a threat the indicator for a device may be red, and if urgent medical care is needed the indicator for a device may be blue.

Site map 162 is surrounded in mobile application 160 by tool perimeter 164. Mobile application 160 of FIG. 17 presents a robust user interface, with tool perimeter 164 including tools appropriate to user profiles such as, for example, site staff, security personnel and/or first responders. For other user profiles such as, for example, students, congregation, etc., mobile application 160 may present a simplified user interface without tool perimeter 164.

For violent threats, the threat location, danger zone and buffer area are determined and incorporated into site map 162 as described above. Within site map 162, in the example shown in FIG. 17, three IoT devices A, B and C are active and used as polygon points to define threat location 1 and danger zone 6. Buffer area 7 is formed around danger zone 6. IoT devices D, E and F intersect buffer area 7, and thus are moved to an alarm state with a large red "X" indication being overlaid on their icons to indicate that those devices are in an alarm state and have been instructed to hide or shelter in place. Devices G, H and I are outside of buffer area 7 and, depending on their proximity from threat location 1, are placed in either an alert or an awake state, with a directional green arrow indication being overlaid on their icons to indicate that those devices are in an alert or an awake state and have been provided with directional guidance away from threat location 1. Based on the threat location, the indicators may change from a directional escape arrow to a shelter-in-place "X", and vice-versa. As the threat moves through the site, breadcrumb indications are provided to follow the moving location of the threat, and the state of the devices change as they enter and exit the threat buffer area.

In the example of FIG. 17, a list 166 of IoT devices in the system is provided on the left side of tool perimeter 164, along with icons showing the current states of the active devices (i.e. alarm, alert, awake or asleep). "Join Call" button 168 is provided on the top left side of tool perimeter 164 to provide the option to join a security team call. "Call 911" button 170 is provided at the bottom right side of tool perimeter 164 to place a call to the local 911 center from a local or remote location. "All Clear" button 172 is provided at the top right side of tool perimeter 164 to end an incident and return all devices to an "asleep" state. As described previously, "all clear" button 172 requires an enhanced level of password/security to operate, such as two level security authorization passwords.

When an IoT device is by a first responder, different icons for the IoT device may be used in order to indicate the type of first responder. For example, different IoT device icons could be provided to distinguish between law enforcement, medical and fire rescue personnel.

Level of severity slider 174 is provided on the right side of perimeter 164 so that users with appropriate permission/profile are able to indicate the severity of the incident. Buffer area slider 176 is provided at the bottom of perimeter 164 so that users with appropriate permission/profile are able to increase or decrease the buffer area surrounding the danger zone. Zoom buttons 178 are provided to zoom site map 162 in and out.

As noted above, the tools provided in tool perimeter 164 may vary depending on the user profile. An on-site teacher, for example, may have different tools available to them in tool perimeter 164 than does a first responder. For some user profiles, only site map 162 may be shown and tool perimeter 164 may be omitted completely. Moreover, different user profiles may be activated or notified based on threat level. For example, when any device goes to an "awake" state, on-site personnel or staff may be notified and their mobile application 160 activated. When any device goes to an "alert" state, the manager or supervisor of the site may be notified. When any device goes to an "alarm" state, local police may be notified. On manual button press, such as in-sight button 122 or med-alert slide switch 124 the state may go to "alarm", and the press of the 911 Call button may place a call to the local 911 center.

In the instance of a guest mobile application, the user interface may optionally include a cautionary "unsafe" input button. The "unsafe" button may be used by guests while in the area of a protected site if they are in a situation in which they feel unsafe. For example, if a guest user enters a shopping mall that is protected by the system and notices or feels they are being followed by a suspicious character, they may press the "unsafe" button. On pressing the "unsafe" button, the guest's mobile device sends the geolocation of the device to server 302 and an alert can be sent, for example, to an on-site first responder.

In addition to maintaining individual device alert states and notifications, overall status of system 50 may also be maintained and cycle in stages. For example, the overall status of system 50 may cycle as follows: (1) all clear; (2) active; (3) 911; (4) standby all clear; and (6) back to all clear.

Mobile application 160 is used by those being protected and is also shared externally with first responders, enabling a precise response to the location of the threat or medical need. For security teams there is a joint call option for on-site and remote users. Upon system activation, a call may be placed to the IoT devices in system 50 to allow the security team to have a conversation and coordinate the response while viewing mobile application 160, which could lead to a choice to call to 911.

Figure 18:
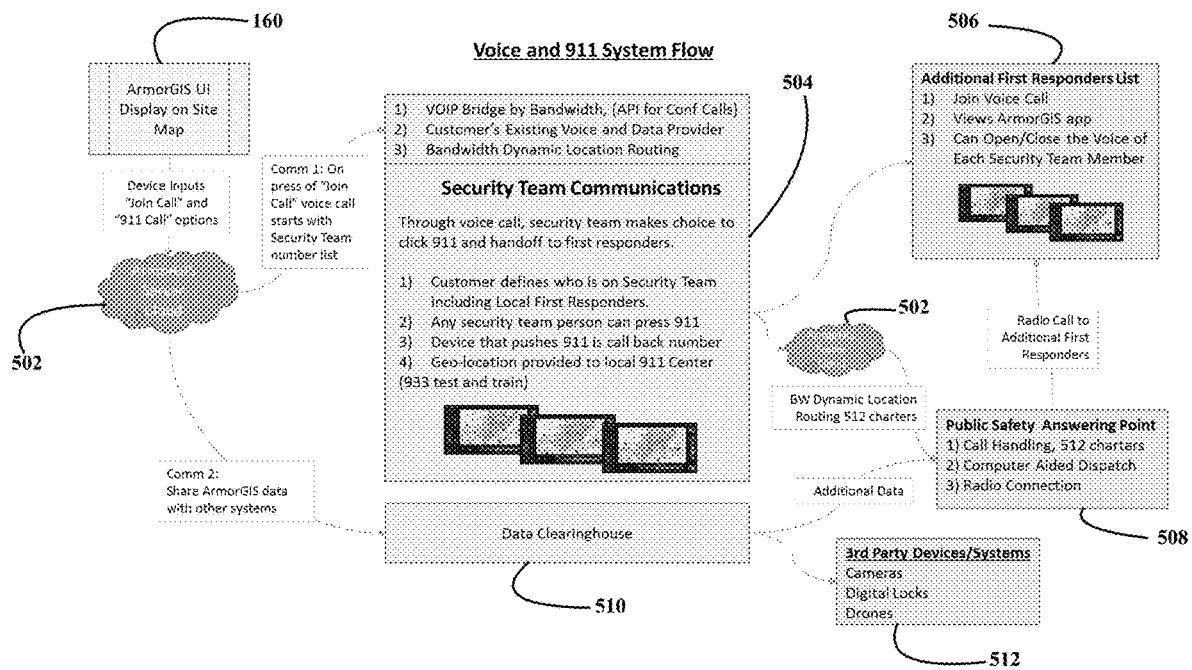
FIG. 18 is a diagram showing voice and 911 call flow according to the present invention.

FIG. 18 is a diagram showing voice and 911 call flow according to the present invention. Voice and 911 call flow is initiated when "Join Call" button 168 or "Call 911" button 170 is actuated on mobile application 160. These inputs are communicated to server cloud 502, which in turn communicates with security team center 504. On the press of "Join Call" button 168, a voice call is started between the user of mobile application 160 and security team center 504. The call may be initiated, for example, by VOIP bridge by bandwidth (API for conference calls); by the user's existing voice and data provider; or by bandwidth dynamic location routing.

Once the call is initiated, the security team makes the decision to call (or not call) 911 and/or handoff to first responders. Typically, the customer (i.e. the party to be protected) defines who is on the security team, including local first responders. Once the call is initiated, any security team member can press 911. The phone number of the user mobile device that pressed "Call 911" button 170 is used as the 911 call back number. The geo-location of the threat location is provided to the local 911 call center regardless of the locale of the security team member who presses the 911 call button. A 933 call can also be used for testing without creating an actual 911 alert.

Depending on the incident type and severity, security team center 504 may also communicate with additional first responders 506. Additional first responders 506 may join an ongoing voice call, view the mobile application user interface (with permissions based on their user profile). These permissions may include, for example, the ability to open/close the voice of each security team member.

Security team center 504 may also communicate via server cloud 502 with public safety answering point (PSAP) 508. This communication may be, for example, by bandwidth dynamic location or in accordance with routing 512 charters. PSAP 508 may perform call handling in accordance with 512 charters, computer aided dispatch and radio connection. PSAP 508 may also make a radio call to additional first responders 506.

As shown in FIG. 18, a "Join Call" or "Call 911" input from a mobile application user may also be communicated to data clearinghouse 510, for the purpose of sharing the data generated by system 50 with other systems. Sharing of data with various different groups and systems in a given area creates a unified area wide GIS driven response system of shared information. Data clearinghouse 510 may share data, for example, with third party devices/systems 512 such as cameras, digital locks, drones and the like. In addition, data clearinghouse 510 may share data with PSAP 508. In addition, through device pairing with the IoT devices, additional devices may be utilized to provide further data input into the system, such as devices indicating directional movement of people and their equipment and distance measuring devices.

Figure 19:
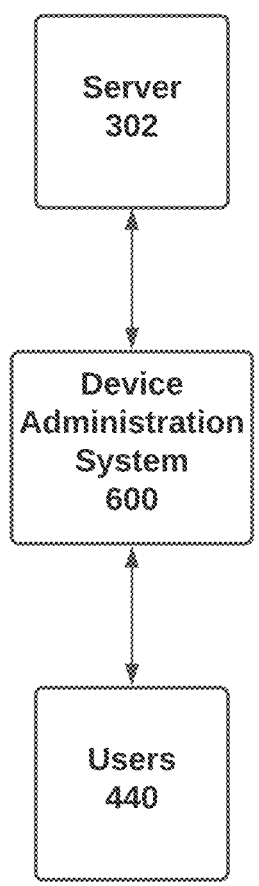
FIG. 19 is a diagram showing a device administration system.

As shown in FIG. 19, the present invention may also provide a device administration system 600 to allow a maintenance manager or system administrator, for example, to perform administration and monitoring of the IoT devices.

Functionality such as customer management, user roster management, device settings and customer set up may be provided by device administration system 600. In one embodiment, device administration system 600 is implemented in an on-line cloud-based customer relationship management platform, such as that provided by Salesforce, or an alternative platform.

Device administration system 600 is in two-way communication with server 302. Information concerning IoT devices 100 may be received from server 302 and indicated on the user interface. This information may include, for example, battery levels of each device and health checks of the device, such as an offline indication for any device that was expected to have an online notification. The ability to order new or additional IoT devices, and to add and remove IoT devices from the system may be provided. Administrators may receive customer support, for example, through a knowledge base lookup or by submitting a support case.

Users 440 including protected persons/staff, security teams and local responders, 911 centers and other device integrations may have access to device administration system 600, which may vary based on their user profile and permissions.

The methods and techniques described herein may be performed by computer systems such as those embodied by IoT devices 100, and the servers of IoT device management system component 200, IoT device data computation component 300 and GIS system processing and site map component 400. Processors of these components, such as processor 102 of IoT device 100 and processors in the servers of components 200, 300, 400, execute one or more sequences of instructions contained in a memory, such as memory 104 of IoT device 100 and memories in the servers of components 200, 300, 400. Execution of the instructions contained in these memories cause processors to perform the methods and techniques described herein.

Memory 104 of IoT device 100, as well as the memories utilized in components 200, 300 and 400, may be any non-transitory computer-readable or machine-readable medium that is suitable for storing or transmitting information in a form (e.g. software instructions or processing applications) readable by a computer or machine. Common forms of such media include magnetic storage media, optical storage media (e.g. CD-ROM), magneto-optical storage media, read-only memory (ROM), random access memory (RAM), erasable programmable memory (e.g. EPROM and EEPROM), flash memory, or other media suitable for storing electronic instructions.

The present invention includes various methods and steps that may be performed by hardware components or may be embodied in machine-executable instructions, which cause a general-purpose or special-purpose processor programmed with those instructions to perform the methods and steps of the invention. The methods and steps may be performed by a combination of hardware, software and/or firmware.

The systems, methods, techniques, instruction sequences and/or computer program products described herein are but one particular embodiment of the present invention. The invention may be implemented in other ways, and the specific order or hierarchy of the steps of the methods described herein may be altered while remaining within the scope of the invention.

Various changes may be made in the form, construction and arrangement of the components described herein without departing from the scope of the invention and without sacrificing its attendant advantages. To give one example, the components of the GIS system may be combined into less than or more than three components 200, 300 and 400. The GIS system being separated into three separate components is merely one implementation example. Many variations, modifications, additions and improvements are possible and fall within the scope of the invention as defined in the following claims.

The invention claimed is:

1. An early alert and location intelligence geographic information system (GIS) comprising:
    a plurality of Internet of Thing (IoT) devices; and
    a GIS system, wherein
    the GIS system tracks locations and movements of the IoT devices;
    the GIS system is activated when an IoT device signals detection of a threat or an urgent medical need;
    based on processing by the GIS system, smart alerts are provided on user IoT devices, and GIS locations are indicated on a mobile software application;
    the GIS system communicates escape directions and shelter guidance to the mobile software applications of those affected; and
    smart alert escalations are provided as needed to personnel such as on-site security, law enforcement, first responders and 911 dispatchers; and precise location intelligence is shared in real-time with such personnel,
    wherein each of the plurality of IoT devices comprises:
    a sensor that captures data indicative of movement, acceleration and orientation of the IoT device;
    input devices including an in-sight input device allowing a user to signal that an attacker is in sight, a med-alert input device allowing a user to signal an urgent medical emergency, and a microphone;
    output devices including a speaker, a vibration generator and a visual output device; and
    wireless connectivity components to provide for two-way wireless communication with other IoT devices and the GIS system, including a WIFI communication module, a Bluetooth communication module, and a cellular communication module.

2. The system of claim 1, wherein the GIS system comprises:
    a device management component that stores the settings and configurations for each IoT device and for each IoT device user;
    a data computation component that maintains an all device list of all IoT devices in the system, including user profiles and locations, and sensor and state data associated with each device, and that creates and maintains an active device list to which IoT devices are added based on triggering events such as changes in movement, acceleration or orientation, or actuation of the in-sight or med-alert input devices; and
    a GIS site map component that, based on the active device list and device data provided by the data computation component, calculates a threat location and a danger zone around the threat location, and provides alerts and possible escape routes and shelter instructions to the IoT devices and the mobile software applications of those affected.

3. The system of claim 1, wherein the GIS system:
    activates and changes states of the IoT devices in escalating stages from "asleep", to "awake", to "alert" to "alarm" based on data received from the IoT devices, and
    creates an active device list of all activated devices involved in an incident, based on their state.

4. The system of claim 3, wherein activation of the IoT devices and state changes to the "awake" state and further escalating states occurs when:
    device movement sensed by the sensor exceeds a pre-defined movement threshold for a pre-defined period of time;
    acceleration sensed by the sensor exceeds a pre-defined "high g" parameter;
    the degrees of orientation sensed by the sensor exceeds a pre-defined orientation parameter for a pre-defined period of time;
    the in-sight button input device is actuated; or
    the med-alert input device is actuated.

5. The system of claim 4, wherein once the GIS system has changed the state of any IoT device from "asleep" to "awake" or higher, the change in state triggers creation of the active device list, which includes the IoT device that triggered the event.

6. The system of claim 5, wherein the location of the initial device added to active device list is used to calculate the threat location.

7. The system of claim 6, wherein the GIS system uses the locations of the devices in the active device list as polygon points to calculate the threat location, to define a danger zone around the threat location, and to define a buffer area around the danger zone.

8. The system of claim 7, wherein
    as IoT devices are added to the active device list, the GIS system tracks an elapsed time that each device has been active (on time count), and sorts the IoT devices on the active device list by their on time count,
    when the number of IoT devices that are on the active device list exceeds a pre-defined maximum number, the IoT devices with the longest on time counts are dropped from use as polygon points that define the danger zone, and
    when the on time count of an IOT device on the active device list exceeds a pre-defined maximum on time count, it is dropped from use as a polygon points to define the danger zone.

9. The system of claim 8, wherein the GIS system uses data from the active device list and the all device list to create a site map, the data including:
    location data of the IoT devices including includes GPS latitude/longitude and altitude; WIFI latitude/longitude and altitude; and Bluetooth latitude/longitude and altitude;
    sensor data including movement, acceleration and orientation of the IoT devices; and
    state data for each device, including whether the device is active, and whether its in-sight input device or med-alert input device have been actuated.

10. The system of claim 9, wherein a user profile is also included in the data for each IoT device, which impacts a mobile application and user interface that is provided to that user profile.

11. The system of claim 10, wherein the GIS system
    uses the location data of the IoT devices on the active device list as polygon points to form a polygon, and
    defines the threat location as the center of the polygon, defines a danger zone as the area within the polygon, and defines a buffer area within a predefined proximity around the danger zone.

12. The system of claim 11, wherein the GIS system changes the states of the IoT devices based on proximity to the calculated threat location.

13. The system of claim 12, wherein IoT devices within the buffer area have their alarm state enabled, devices within a pre-defined alert proximity of the threat location have their alert state enabled, and devices within a pre-defined awake proximity of the threat location have their awake state enabled.

14. The system of claim 13, wherein the site map generated by the GIS system is displayed in real time in mobile applications on user devices such as phones, tablets or computer browsers, the site map including:
the threat location, the danger zone and the buffer area,
device indicators, states and locations relative to the threat location, the danger zone and buffer area,
for devices within alert or awake proximity to the threat location, instructions or directions to an escape path,
for devices within alarm proximity, instructions to shelter in place.

15. The system of claim 14, wherein,
for devices within alert or awake proximity to the threat location, a directional arrow pointing away from the threat location is displayed in the mobile application, and
for devices within alarm proximity to the threat location, an X is displayed in the mobile application indicating to shelter in place.

16. The system of claim 14, wherein
the sizes and locations of the threat location, danger zone and buffer area change dynamically in real time based on data received from the IoT devices, and
the device indicators and states change dynamically in real time based on their proximity to the threat location, buffer zone and threat area.

17. The system of claim 16, wherein a breadcrumb trail is displayed on the site map to show movement of the threat from a previous threat location to a new threat location.

18. The system of claim 17, wherein the user mobile application includes one or more of the following tools based on the profile of the user of the application:
a list of the IoT devices in the system along with their current states;
a Join Call button to provide the option to join a security team call;
a Call 911 button to place a call to a local 911 center;
an All Clear button to enable users with appropriate permission to signal an end to an incident;
a level of severity slider to enable users with appropriate permission to indicate the severity of the incident; and
buffer area slider to enable users with appropriate permission to increase or decrease the buffer area surrounding the danger zone.

19. The system of claim 18, wherein different user profiles are activated or notified based on whether the system is in the awake state, the alert state, or the alarm state.

* * * * *